US010358557B1

(12) United States Patent
Veregin et al.

(10) Patent No.: US 10,358,557 B1
(45) Date of Patent: Jul. 23, 2019

(54) TONER COMPOSITIONS AND SURFACE POLYMERIC ADDITIVES

(71) Applicant: XEROX CORPORATION, Norwalk, CT (US)

(72) Inventors: Richard P. N. Veregin, Mississauga (CA); Nan-Xing Hu, Oakville (CA); Hajir Mokhtari, North York (CA); Majid Kamel, Mississauga (CA); Wafa F. Bashir, Mississauga (CA); Cuong Vong, Hamilton (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/914,411

(22) Filed: Mar. 7, 2018

(51) Int. Cl.
  *G03G 9/08* (2006.01)
  *C08L 83/12* (2006.01)
  *G03G 9/087* (2006.01)

(52) U.S. Cl.
  CPC .............. C08L 83/12 (2013.01); G03G 9/08 (2013.01); G03G 9/0825 (2013.01); G03G 9/08759 (2013.01); G03G 9/08773 (2013.01); C08L 2207/53 (2013.01)

(58) Field of Classification Search
  CPC . G03G 9/08759; G03G 9/08773; C08L 83/12
  USPC ..................................... 430/109.1
  See application file for complete search history.

(56) References Cited

U.S. PATENT DOCUMENTS

| | | |
|---|---|---|
| 3,590,000 A | 6/1971 | Palermiti et al. |
| 3,681,106 A | 8/1972 | Burns et al. |
| 3,847,604 A | 11/1974 | Hagenbach et al. |
| 4,295,990 A | 10/1981 | Verbeek et al. |
| 4,298,672 A | 11/1981 | Lu |
| 4,338,390 A | 7/1982 | Lu |
| 4,533,614 A | 8/1985 | Fukumoto et al. |
| 4,845,006 A | 7/1989 | Matsubara et al. |
| 4,863,824 A | 9/1989 | Uchida et al. |
| 4,863,825 A | 9/1989 | Yoshimoto et al. |
| 4,917,983 A | 4/1990 | Uchida et al. |
| 4,931,370 A | 6/1990 | Amaya et al. |
| 4,933,252 A | 6/1990 | Nishikawa et al. |
| 4,935,326 A | 6/1990 | Creatura et al. |
| 4,937,166 A | 6/1990 | Creatura et al. |
| 4,957,774 A | 9/1990 | Doi et al. |
| 4,973,539 A | 11/1990 | Sacripante et al. |
| 4,980,448 A | 12/1990 | Tajiri et al. |
| 4,981,939 A | 1/1991 | Matsumura et al. |
| 4,988,794 A | 1/1991 | Kubo et al. |
| 5,057,596 A | 10/1991 | Kubo et al. |
| 5,143,809 A | 9/1992 | Kaneko et al. |
| 5,215,849 A | 6/1993 | Makuta et al. |
| 5,227,460 A | 7/1993 | Mahabadi et al. |
| 5,236,629 A | 8/1993 | Mahabadi et al. |
| 5,290,654 A | 3/1994 | Sacripante et al. |
| 5,302,486 A | 4/1994 | Patel et al. |
| 5,330,874 A | 7/1994 | Mahabadi et al. |
| 5,376,494 A | 12/1994 | Mahabadi et al. |
| 5,480,756 A | 1/1996 | Mahabadi et al. |
| 5,500,324 A | 3/1996 | Mahabadi et al. |
| 5,601,960 A | 2/1997 | Mahabadi et al. |
| 5,629,121 A | 5/1997 | Nakayama |
| 5,650,484 A | 7/1997 | Hawkins et al. |
| 5,750,909 A | 5/1998 | Hawkins et al. |
| 6,063,827 A | 5/2000 | Sacripante et al. |
| 6,120,967 A | 9/2000 | Hopper et al. |
| 6,214,507 B1 | 4/2001 | Sokol et al. |
| 6,326,119 B1 | 12/2001 | Hollenbaugh, Jr. et al. |
| 6,358,657 B1 | 3/2002 | Silence et al. |
| 6,359,105 B1 | 3/2002 | Ianni et al. |
| 6,379,855 B1 * | 4/2002 | Hayashi .................. C07C 25/24 428/405 |
| 6,592,913 B2 | 7/2003 | Cook et al. |
| 6,593,053 B1 | 7/2003 | Chang et al. |
| 7,329,476 B2 | 2/2008 | Sacripante et al. |
| 8,663,886 B2 | 3/2014 | Vanbesien et al. |
| 2006/0216626 A1 | 9/2006 | Sacripante et al. |
| 2008/0107990 A1 | 5/2008 | Field et al. |
| 2008/0236446 A1 | 10/2008 | Zhou et al. |
| 2009/0047593 A1 | 2/2009 | Vanbesien et al. |
| 2012/0156605 A1 * | 6/2012 | Vanbesien ............ G03G 9/0823 430/108.2 |
| 2012/0156606 A1 | 6/2012 | Vanbesien et al. |

* cited by examiner

*Primary Examiner* — Mark A Chapman
(74) *Attorney, Agent, or Firm* — Pillsbury Winthrop Shaw Pittman LLP

(57) ABSTRACT

The present disclosure provides polymeric composition for use with toner particles. The polymeric composition of the present disclosure includes a silicone-polyether copolymer and a polymeric additive, wherein the silicone-polyether copolymer comprising a polysiloxane unit and a polyether unit, and the polymeric additive comprising a copolymer possessing at least one monomer having a high carbon to oxygen ratio, a monomer having more than one vinyl group, and at least one amine-functional monomer. The present disclosure also provides method of making thereof.

20 Claims, No Drawings

TONER COMPOSITIONS AND SURFACE POLYMERIC ADDITIVES

BACKGROUND

The present disclosure is generally directed to toner compositions, and more specifically, to toner compositions comprising polymeric compositions. The polymeric compositions further include a polymeric additive and a silicone-polyether copolymer.

Electrophotographic printing utilizes toner particles which may be produced by a variety of processes. One such process includes an emulsion aggregation ("EA") process that forms toner particles in which surfactants are used in forming a latex emulsion. See, for example, U.S. Pat. No. 6,120,967, the disclosure of which is hereby incorporated by reference in its entirety, as one example of such a process.

Combinations of amorphous and crystalline polyesters may be used in the EA process. This resin combination may provide toners with high gloss and relatively low-melting point characteristics (sometimes referred to as low-melt, ultra low melt, or ULM), which allows for more energy efficient and faster printing.

The use of additives with EA toner particles may be important in realizing optimal toner performance, such as, for providing improved charging characteristics, improved flow properties, and the like. Poor fusing creates problems in paper adhesion and print performance. Poor toner flow cohesion can affect toner dispense, which creates problems in gravity-fed cartridges, and leads to deletions on paper. In addition, the use of additives with EA toner particles may also mitigate bias charge roller (BCR) contamination.

There is a continual need for improving the additives used in toners, including formation of EA toners, especially low-melt EA toners to improve toner flow and reduce BCR contamination. There is also a continual need to develop lower cost EA toners.

SUMMARY

The present disclosure provides polymeric compositions and processes for producing same. In embodiments, the polymeric composition comprises a silicone-polyether copolymer further comprising a polysiloxane unit and a polyether unit; and a polymeric additive further comprising a copolymer comprising at least a first monomer having a high carbon to oxygen ratio of from about 3 to about 8, a second monomer comprising more than one vinyl group, and at least a third monomer comprising an amine.

In embodiments, the present disclosure provides a toner comprising at least one resin, in combination with an optional colorant, and an optional wax; and a polymeric composition comprising a polymeric additive further comprising a copolymer comprising at least a first monomer having a high carbon to oxygen ratio of from about 3 to about 8, a second monomer comprising more than one vinyl group, and at least a third monomer comprising an amine; and a silicone-polyether copolymer further comprising a polysiloxane unit and a polyether unit.

In other embodiments, the present disclosure provides a process of preparing a polymeric composition comprising: providing a polymeric additive comprising a copolymer comprising at least a first monomer having a high carbon to oxygen ratio of from about 3 to about 8, a second monomer comprising more than one vinyl group, and at least a third monomer comprising an amine; mixing a silicone-polyether copolymer with the polymeric additive, wherein the silicone-polyether copolymer comprises a polysiloxane unit and a polyether unit.

DETAILED DESCRIPTION OF EMBODIMENTS

In the following description, it is understood that other embodiments may be utilized and structural and operational changes may be made without departure from the scope of the present embodiments disclosed herein.

Unless otherwise stated or defined, all technical and scientific terms used herein have commonly understood meanings by one of ordinary skill in the art to which this invention pertains.

In this specification and the claims that follow, singular forms such as "a," "an," and "the" include plural forms unless the content clearly dictates otherwise. All ranges disclosed herein include, unless specifically indicated, all endpoints and intermediate values.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

The present disclosure provides a polymeric composition for use with toner particles. The polymeric composition includes a polymeric additive and a silicone-polyether copolymer. In embodiments, the silicone-polyether copolymer is disposed on the exterior surface of the polymeric additive. The resulting polymeric composition may be then blended on the toner particles, or mixed with the toner particles.

Silicone-Polyether Copolymer

In embodiments, the silicone-polyether copolymer contains a polysiloxane (also known as silicone) unit and a polyether unit.

The polysiloxane unit may have the formula (I):

wherein each $R_1$ may be independently H, or an alkyl group; wherein each $R_2$ may be independently an alkyl group; wherein n is from 2 to 1300, or from 5 to 500, or from 10 to 300. In embodiment, each one of $R_1$ and $R_2$ may be methyl (i.e., the polysiloxane unit is dimethicone, which is also known as polydimethylsiloxane (PDMS)). When each one of $R_1$ and $R_2$ are methyl, Formula (I) may be refer to as polydimethylsiloxane or dimethylpolysiloxane. The term "alkyl" is intended to include branched, straight chain and cyclic, substituted or unsubstituted saturated aliphatic hydrocarbon groups. Alkyl groups can comprise about 1 to about 24 carbon atoms ("C1-C24"), about 7 to about 24 carbon atoms ("C7-C24"), about 8 to about 24 carbon atoms ("C8-C24"), or about 9 to about 24 carbon atoms ("C9-C24"). Alkyl groups can also comprise about 1 to about 8 carbon atoms ("C1-C8"), about 1 to about 6 carbon atoms ("C1-C6"), or about 1 to about 3 carbon atoms ("C1-C3"). Examples of C1-C6 alkyl groups include, but are not limited to, methyl, ethyl, propyl, isopropyl, n-butyl, isobutyl, tert-butyl, n-pentyl, neopentyl and n-hexyl radicals.

The polyether unit may contain more than one ether group represented by the formula $(C_nH_{2n}O)_k$, wherein n is an integer of from 1 to about 5, k is a number of the repeating unit ranging from about 2 to about 300. In specific embodiments, the polyether unit may be $(OCH_2CH_2)_k$. In specific embodiments the polyether may also include a branched repeat unit, $(OCH_2CH_2 \; CH_2)_k$. In embodiments, the polyether unit may be selected from the group consisting of a poly(ethylene oxide), a poly(propylene oxide), and a copolymer of poly(ethylene oxide),poly(propylene oxide), and mixtures thereof.

In embodiments, the silicone-polyether copolymer may have the formula (II):

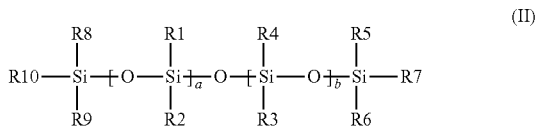

(II)

wherein each of $R_1$ to $R_{10}$ vary independently. $R_1$ may be H, or an alkyl group; $R_2$ may be alkyl; each of $R_3$, $R_5$ and $R_8$ independently may be H, alkyl, —$(CH_2)_3$—O—$(CH_2CH_2O)_c$—$(CH_2(CH_3)CHO)_d$—H, —$(CH_2)_3$—O—$(CH_2CH_2O)_c$—$(CH_2(CH_3)CHO)_d$—$(CH_2CH_2O)_e$—H, —$(CH_2CH_2O)$—$(CH_2CH_2O)_f$—H, —$(C_nH_{2n})$—$(C_mH_{2m}O)_c$—$(C_pH_{2p}O)_d$—H; $R_4$ is —$(CH_2)_3$—O—$(CH_2CH_2O)_c$—$(CH_2(CH_3)CHO)_d$—H, —$(CH_2)_3$—O—$(CH_2CH_2O)_c$—$(CH_2(CH_3)CHO)_d$—$(CH_2CH_2O)_e$—H, —$(CH_2CH_2O)$—$(CH_2CH_2O)_f$—H, or —$(C_nH_{2n})$—$(C_mH_{2m}O)_c$—$(C_pH_{2p}O)_d$—H; each of $R_6$, $R_7$, $R_9$ and $R_{10}$ independently may be alkyl, —$(CH_2)_3$—O—$(CH_2CH_2O)_c$—$(CH_2(CH_3)CHO)_d$—H, —$(CH_2)_3$—O—$(CH_2CH_2O)_c$—$(CH_2(CH_3)CHO)_d$—$(CH_2CH_2O)_e$—H, —$(CH_2CH_2O)$—$(CH_2CH_2O)_f$—H, or —$(C_nH_{2n})$—$(C_mH_{2m}O)_c$—$(C_pH_{2p}O)_d$—H; wherein a may be from 0 to 1000; b may be from 0 to 300; each of c, d, and e may be independently from 0 to 300; f may be from 1 to 300; each of n, m and p may be independently integers of from 2 to 5.

The amount of silicon atom present in the silicone-polyether copolymer is from about 0.5% to about 5%, from about 0.6% to about 4%, or from about 0.7% to about 3%, as determined by XPS spectroscopy.

In embodiments, the silicone-polyether copolymer may include a linear block copolymer in which the polyether unit is bound to the terminal end of a polysiloxane unit, a grafted copolymer in which the polyether unit is bound to the polysiloxane unit as a pendent group, or a copolymer comprising a mixture thereof. The term "block copolymers" encompasses within its scope two or more different units (any two or more units selected from the polysiloxane unit and/or the polyether unit) which are linked to form a single polymer molecule. The block copolymers are in the form of di-, tri- and multi-block polymers. The term "polymer block" refers to one of the blocks of the block copolymer.

In embodiments, the polyether unit may be selected from the group consisting of a poly(ethylene oxide), a poly(propylene oxide), a copolymer of poly(ethylene oxide) and poly(propylene oxide), and mixtures thereof.

In embodiments, the silicone polyether copolymer may have at least one carbinol functional group. As described herein, the term "carbinol" refers to a hydroxyl group bound to carbon atom (C—OH).

In embodiments, the silicone polyether copolymer may have an average molecular weight ranging from about 100 to about 100,000, from about 400 to about 40,000, from about 2,000 to about 30,000.

In embodiments, the silicone polyether copolymer may have a viscosity (cps) of from about 50 to about 100000, from about 100 to about 30000, or from about 200 to about 5000.

In embodiments, the silicone-polyether copolymer may include formulae (III), (IV), and the like, and mixtures thereof. Formulae (III) and (IV) are shown below:

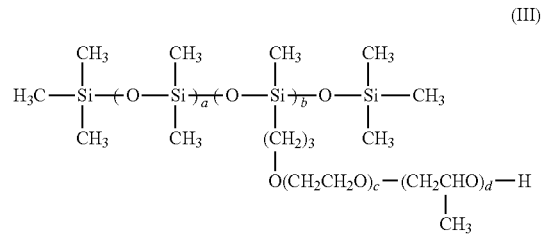

(III)

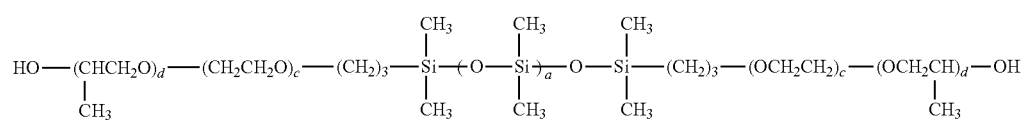

(IV)

wherein each a is independently from about 1 to about 1000, each b is independently from about 1 to about 300, each c is independently from about 1 to about 300, each d is independently from about 0 to about 300, further wherein the average molecular weights of the silicone-polyether copolymer is from about 300 to about 100,000. The average molecular weight of these copolymers may range from about 300 to about 30,000, or from about 500 to about 15,000.

In embodiments, the silicone polyether copolymer is water soluble. In embodiments, the silicone polyether copolymer is water dispersible.

Some examples of silicone polyether copolymer include, but are not limited to, PEG-12 dimethicone (an ethoxylated polydimethylsiloxane modified with polyethylene glycol of average chain length of 12 units) as Silsurf® D212-CG, PEG-10 Dimethicone (a silicone glycol copolymer modified with polyethylene glycol of average chain length of 10 units) as Silsurf®C410, PEG/PPG-18/18 Dimethicone, (a silicone glycol polyether, where the silicone is modified with polyethylene glycol of average chain length of 18 units and polypropylene glycol of average chain length of 18 units) as Silsurf®J1015-O.

In embodiments, the silicone polyether copolymer may be present in the polymeric composition in an amount of from about 0.1% to about 3% by weight, such as in an amount of from about 0.2% to about 2% by weight, from about 0.3% to about 1.8%, or from about 0.4% to about 1.5% by weight of the polymeric composition.

In embodiments, the silicone polyether copolymer may cover from about 5% to about 100%, from about 10% to about 99%, or from about 30% to about 90% of the surface area of the polymeric additive.

Polymeric Additive

The polymeric additive may be prepared by emulsion polymerization, by mini-emulsion polymerization, by suspension polymerization, by phase inversion, or by another other process without limitation that can produce a particulate dispersion in an aqueous phase.

In embodiments, the polymeric additive may be formed via the emulsion polymerization (EP) process. The EP process produces a latex which can be utilized as the polymeric additive of the present disclosure. The latex includes at least one monomer with a high carbon to oxygen (C/O) ratio, combined with a monomer possessing two or more vinyl groups, combined with a monomer containing an amine functionality. The use of a high C/O ratio monomer provides good relative humidity (RH) stability, and the use of the amine functional monomer provides desirable charge control for the resulting toner composition. The use of a monomer possessing two or more vinyl groups, sometimes referred to herein, in embodiments, as a crosslinking vinyl monomer, provides a crosslinked property to the polymer, thereby providing mechanical robustness required in the developer housing.

In embodiments, the polymeric additive may include a monomer having a high C/O ratio, such as an acrylate or a methacrylate. The C/O ratio of such a monomer may be from about 3 to about 8, in embodiments from about 4 to about 7, in embodiments from about 5 to about 6. In embodiments, the monomer having a high C/O ratio may be an aliphatic cycloacrylate. Suitable aliphatic cycloacrylates which may be utilized in forming the polymer additive include, for example, cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornylmethacrylate, isobornyl acrylate, benzyl methacrylate, phenyl methacrylate, combinations thereof, and the like.

The cycloacrylate may be present in a copolymer utilized as a polymeric additive in an amount of from about 40% by weight of the copolymer to about 99.4% by weight of the copolymer, in embodiments from about 50% by weight of the copolymer to about 90% by weight of the copolymer.

In embodiments, the polymeric additive may include monomer possessing vinyl groups, in embodiments two or more vinyl groups. Suitable monomers having vinyl groups for use as the crosslinking vinyl containing monomer include, for example, diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2'-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthaline, divinyl ether, combinations thereof, and the like.

The monomer possessing two or more vinyl groups may be present in a copolymer utilized as a polymeric additive in an amount of from about 0.1% by weight of the copolymer to about 50% by weight of the copolymer, in embodiments from about 10% by weight of the copolymer to about 30% by weight of the copolymer.

In embodiments, the polymeric additive may include a monomer having an amine functionality. Monomers possessing an amine functionality may be derived from acrylates, methacrylates, combinations thereof, and the like. In embodiments, suitable amine-functional monomers include dimethylaminoethyl methacrylate (DMAEMA), diethylaminoethyl methacrylate, dipropylaminoethyl methacrylate, diisopropylaminoethyl methacrylate, dibutylaminoethyl methacrylate, combinations thereof, and the like.

The amine-functional monomer may be present in such a copolymer in an amount of from about 0.1% by weight of the copolymer to about 40% by weight of the copolymer, in embodiments from about 0.5% by weight of the copolymer to about 5% by weight of the copolymer.

Methods for forming the polymeric additive are within the purview of those skilled in the art and include, in embodiments, emulsion polymerization of the monomers utilized to form the polymeric additive.

In the polymerization process, the reactants may be added to a suitable reactor, such as a mixing vessel. The appropriate amount of starting materials may be optionally dissolved in a solvent, an optional initiator may be added to the solution, and contacted with at least one surfactant to form an emulsion. A copolymer may be formed in the emulsion (latex), which may then be recovered and used as the polymeric additive for a toner composition.

Where utilized, suitable solvents include, but are not limited to, water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

In embodiments, the latex for forming the polymeric additive may be prepared in an aqueous phase containing a surfactant or co-surfactant, optionally under an inert gas such as nitrogen. Surfactants which may be utilized with the resin to form a latex dispersion can be ionic or nonionic surfactants in an amount of from about 0.01 to about 15 weight percent of the solids, and in embodiments of from about 0.1 to about 10 weight percent of the solids.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quatemized polyoxyethylalkylamines, dodecylbenzyl triethyl ammonium chloride, MIRAPOL and ALKAQUAT available from Alkaril Chemical Company, SANISOL (benzalkonium chloride), available from Kao Chemicals, combinations thereof, and the like. In embodiments a suitable cationic surfactant includes SANISOL B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxymethyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be utilized.

The choice of particular surfactants or combinations thereof, as well as the amounts of each to be used, are within the purview of those skilled in the art.

In embodiments initiators may be added for formation of the latex utilized in formation of the polymeric additive. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate, and combinations thereof. Other water-soluble initiators which may be utilized include azoamidine compounds, for example 2,2-azobis(2-methyl-N-phenylpropionamidine) dihydrochloride, 2,2'-azobis[N-{4-chlorophenyl)-2-methyl-propionamidine] di-hydrochloride, 2,2-azobis[N-(4-hydroxyphenyl)-2-methyl-propionamidine]dihydrochloride, 2,2'-azobis[N-(4-amino-phenyl)-2-methylpropionamidine] tetrahydrochloride, 2,2-azobis[2-methyl-N(phenylmethyl) propionamidine]dihydrochloride, 2,2-azobis[2-methyl-N-2-propenylpropionamidinejdihydrochloride, 2,2-azobis[N-(2-hydroxy-ethyl)2-methylpropionamide]dihydrochloride, 2,2$^{\prime}$-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-IH-I,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl)propane]dihydrochloride, 2,2'-azobis {2-[I-(2-hydroxyethyl)-2-imidazolm-2-yl]propane}dihydrochloride, combinations thereof, and the like.

Initiators can be added in suitable amounts, such as from about 0.1 to about 8 weight percent, and in embodiments of from about 0.2 to about 5 weight percent of the monomers.

In forming the emulsions, the starting materials, surfactant, optional solvent, and optional initiator may be combined utilizing any means within the purview of those skilled in the art. In embodiments, the reaction mixture may be mixed for from about 1 minute to about 72 hours, in embodiments from about 4 hours to about 24 hours, while keeping the temperature at from about 10° C. to about 100° C., in embodiments from about 20° C. to about 90° C., in other embodiments from about 45° C. to about 75° C.

Those skilled in the art will recognize that optimization of reaction conditions, temperature, and initiator loading can be varied to generate polymers of various molecular weights, and that structurally related starting materials may be polymerized using comparable techniques.

The resulting latex, possessing the polymeric additive of the present disclosure, may have a C/O ratio of from about 3 to about 8, in embodiments from about 4 to about 7. Due to the cross-linking of the monomers used to form the polymeric additive, the gel content of the polymeric additive may be greater than 50%, in embodiments from about 50% to about 100%, in embodiments from about 60% to about 95%, in other embodiments from about 70% to about 90% by weight of the polymeric additive.

In embodiments, the resulting latex, possessing the polymeric additive of the present disclosure, may be mixed with the silicone-polyether copolymer described herein. The term "mixed" or "mixing" may include "dispersing" and "dissolving" of the silicone-polyether copolymer. The term "dispersing" means that there is a phase (the dispersed phase) which consists of finely divided particles (often in the colloidal size range) distributed throughout another bulk phase. As used herein, the dispersed phase may refer to the silicone-polyether copolymer, and the bulk phase may refer to the aqueous phase that contains the polymeric additive. Dispersing a silicone-polyether copolymer with a polymeric additive in an aqueous phase may allow the silicone-polyether copolymer to be coated on the polymeric additive surface. The term "dissolving" means distributing the silicone polyether evenly in an aqueous medium, thereby allowing the dispersed silicone polyether to be deposited uniformly on the surface of the polymeric additive latex in the aqueous medium. The term "dissolving" means the silicone polyether is dispersed evenly in an aqueous medium and the dispersion of the silicone polyether is at the level of individual molecules, in this regard, each molecule of silicone polyether is separated from each other by water molecules, enabling a uniform deposition of the silicone polyether molecules onto the surface of the organic additive latex in the aqueous medium.

In embodiments, the resulting latex, possessing the polymeric additive of the present disclosure, may be mixed with the silicone-polyether copolymer described herein. In embodiments, the resulting latex may be first dried, and then mixed with the silicone-polyether copolymer described herein. In embodiments, the resulting latex, possessing the polymeric additive of the present disclosure, may be first dried, and then surfaced treated with the silicone-polyether copolymer to form the polymeric composition. In other embodiments, the silicone-polyether copolymer may be dispersed or dissolved in the resulting latex, and the resulting dispersion may be subsequently dried to form the polymeric composition.

In embodiments, the polymeric additive may be dried by technique within the purview of those skilled in the art, including filtration, drying, centrifugation, spray drying, combinations thereof, and the like. In embodiments, the polymeric additive may be dried to powder form by any method within the purview of those skilled in the art, including, for example, freeze drying, optionally in a vacuum, spray drying, combinations thereof, and the like.

Once the silicone-polyether copolymer is incorporated onto the polymeric additive to form the polymeric composition, the polymeric composition may be applied to toner particles utilizing any means within the purview of one skilled in the art, including, but not limited to, mechanical impaction and/or electrostatic attraction. In embodiments, the toner particles may be dipped in or sprayed with the polymeric composition of the present disclosure, thus becoming coated therewith, and the coated particles may then be dried to leave the polymeric coating thereon.

Particles of the copolymer may have an average or medium particle size (d50) of from about 70 nanometers to about 250 nanometers in diameter, in embodiments from about 80 nanometers to about 200 nanometers in diameter.

The copolymers utilized as the polymeric additive, which, in embodiments, may be soluble in solvents such as tetrahydrofuran (THF), may have a number average molecular weight ($M_n$), as measured by gel permeation chromatography (GPC) of, for example, from about 40,000 to about 280,000 Daltons, in embodiments from about 60,000 to about 170,000 Daltons, and a weight average molecular weight ($M_w$) of, for example, from about 200,000 to about 800,000 Daltons, in embodiments from about 400,000 to about 600,000 Daltons, as determined by Gel Permeation Chromatography using polystyrene standards.

The copolymers utilized as the polymeric additive may have a glass transition temperature (Tg) of from about 85° C. to about 140° C., in embodiments from about 100° C. to about 130° C. In embodiments, A-zone charge of a toner including the polymeric additive of the present disclosure may be from about −15 to about −80 microcolombs per gram, in embodiments from about −20 to about −60 microcolombs per gram, while A-zone charge of a toner including the polymeric additive of the present disclosure may be from about −15 to about −80 microcolombs per gram, in embodiments from about −20 to about −60 microcolombs per gram.

The polymeric composition of the present disclosure may be combined with toner particles so that the polymeric composition is present in an amount of from about 0.1% to about 5% by weight, from about 0.2% to about 4% by weight, or from about 0.5% to about 2% by weight of the toner particles. In embodiments, the polymeric composition may cover from about 5% to about 100%, from about 10% to about 0%, or from about 20% to about 50% of the surface area of the toner particles.

Toners

The polymeric compositions of the present disclosure may be combined with toner resins, optionally possessing colorants, to form a toner of the present disclosure. In embodiments, the polymeric compositions may be coated on the surface of the toner particles.

Resins

Any toner resin may be utilized in forming a toner of the present disclosure. Such resins, in turn, may be made of any suitable monomer or monomers via any suitable polymerization method. In embodiments, the resin may be prepared by a method other than emulsion polymerization. In further embodiments, the resin may be prepared by condensation polymerization.

The toner composition of the present disclosure, in embodiments, includes an amorphous resin. The amorphous resin may be linear or branched. In embodiments, the amorphous resin may include at least one low molecular weight amorphous polyester resin. The low molecular weight amorphous polyester resins, which are available from a number of sources, can possess various melting points of, for example, from about 30° C. to about 120° C., in embodiments from about 75° C. to about 115° C., in embodiments from about 100° C. to about 110° C., and/or in embodiments from about 104° C. to about 108° C. As used herein, the low molecular weight amorphous polyester resin has, for example, a number average molecular weight ($M_n$), as measured by gel permeation chromatography (GPC) of, for example, from about 1,000 to about 10,000, in embodiments from about 2,000 to about 8,000, in embodiments from about 3,000 to about 7,000, and in embodiments from about 4,000 to about 6,000. The weight average molecular weight ($M_w$) of the resin is 50,000 or less, for example, in embodiments from about 2,000 to about 50,000, in embodiments from about 3,000 to about 40,000, in embodiments from about 10,000 to about 30,000, and in embodiments from about 18,000 to about 21,000, as determined by GPC using polystyrene standards. The molecular weight distribution ($M_w/M_n$) of the low molecular weight amorphous resin is, for example, from about 2 to about 6, in embodiments from about 3 to about 4. The low molecular weight amorphous polyester resins may have an acid value of from about 8 to about 20 mg KOH/g, in embodiments from about 9 to about 16 mg KOH/g, and in embodiments from about 10 to about 14 mg KOH/g.

Examples of linear amorphous polyester resins which may be utilized include poly(propoxylated bisphenol A co-fumarate), poly(ethoxylated bisphenol A co-fumarate), poly(butyloxylated bisphenol A co-fumarate), poly(co-propoxylated bisphenol A co-ethoxylated bisphenol A co-fumarate), poly(1,2-propylene fumarate), poly(propoxylated bisphenol A co-maleate), poly(ethoxylated bisphenol A co-maleate), poly(butyloxylated bisphenol A co-maleate), poly (co-propoxylated bisphenol A co-ethoxylated bisphenol A co-maleate), poly(1,2-propylene maleate), poly(propoxylated bisphenol A co-itaconate), poly(ethoxylated bisphenol A co-itaconate), poly(butyloxylated bisphenol A co-itaconate), poly(co-propoxylated bisphenol A co-ethoxylated bisphenol A co-itaconate), poly(1,2-propylene itaconate), and combinations thereof.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

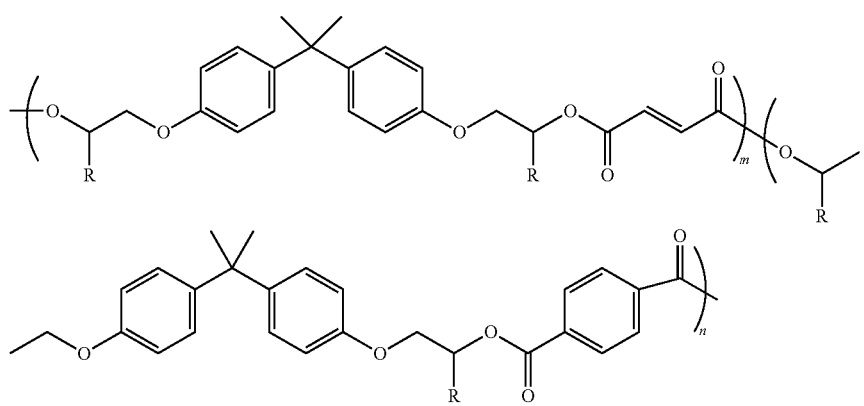

wherein R may be hydrogen or a methyl group, m and n represent random units of the copolymer, m may be from about 2 to 10, and n may be from about 2 to 10. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a latex resin is available under the trade name SPARII™ from Resana S/A Industrias Quimicas, Sao Paulo Brazil. Other suitable linear resins include those disclosed in U.S. Pat. Nos. 4,533,614, 4,957,774 and 4,533,614, which can be linear polyester resins including terephthalic acid, dodecylsuccinic acid, trimellitic acid, fumaric acid and alkyloxylated bisphenol A, such as, for example, bisphenol-A ethylene oxide adducts and bisphenol-A propylene oxide adducts. Other propoxylated bisphenol A terephthalate resins that may be utilized and are commercially available include GTU-FC115, commercially available from Kao Corporation, Japan, and the like.

In embodiments, the low molecular weight amorphous polyester resin may be a saturated or unsaturated amorphous polyester resin. Illustrative examples of saturated and unsaturated amorphous polyester resins selected for the process and particles of the present disclosure include any of the various amorphous polyesters, such as polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-isophthalate, polypropylene-isophthalate, polybutylene-isophthalate, polypentylene-isophthalate, polyhexalene-isophthalate, polyheptadene-isophthalate, polyoctalene-isophthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(ethoxylated bisphenol A-fumarate), poly(ethoxylated bisphenol A-succinate), poly(ethoxylated bisphenol A-adipate), poly(ethoxylated bisphenol A-glutarate), poly(ethoxylated bisphenol A-terephthalate), poly(ethoxylated bisphenol A-isophthalate), poly(ethoxylated bisphenol A-dodecenylsuccinate), poly(propoxylated bisphenol A-fumarate), poly(propoxylated bisphenol A-succinate), poly(propoxylated bisphenol A-adipate), poly(propoxylated bisphenol A-glutarate), poly(propoxylated bisphenol A-terephthalate), poly(propoxylated bisphenol A-isophthalate), poly(propoxylated bisphenol A-dodecenylsuccinate), SPAR (Dixie Chemicals), BECKOSOL (Reichhold Inc), ARAKOTE (Ciba-Geigy Corporation), HETRON (Ashland Chemical), PARAPLEX (Rohm & Haas), POLYLITE (Reichhold Inc), PLASTHALL (Rohm & Haas), CYGAL (American Cyanamide), ARMCO (Armco Composites), ARPOL (Ashland Chemical), CELANEX (Celanese Eng), RYNITE (DuPont), STYPOL (Freeman Chemical Corporation) and combinations thereof. The resins can also be functionalized, such as carboxylated, sulfonated, or the like, and particularly such as sodio sulfonated, if desired.

The low molecular weight linear amorphous polyester resins are generally prepared by the polycondensation of an organic diol, a diacid or diester, and a polycondensation catalyst. The low molecular weight amorphous resin is generally present in the toner composition in various suitable amounts, such as from about 60 to about 90 weight percent, in embodiments from about 50 to about 65 weight percent, of the toner and or of the solids.

Examples of organic diols selected for the preparation of low molecular weight resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of diacid or diesters selected for the preparation of the low molecular weight amorphous polyester include dicarboxylic acids or diesters such as terephthalic acid, phthalic acid, isophthalic acid, fumaric acid, maleic acid, itaconic acid, succinic acid, succinic anhydride, dodecylsuccinic acid, dodecylsuccinic anhydride, dodecenylsuccinic acid, dodecenylsuccinic anhydride, glutaric acid, glutaric anhydride, adipic acid, pimelic acid, suberic acid, azelaic acid, dodecanediacid, dimethyl terephthalate, diethyl terephthalate, dimethyl!sophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, dimethyl dodecenylsuccinate, and mixtures thereof. The organic diacid or diester is selected, for example, from about 45 to about 52 mole percent of the resin.

Examples of suitable polycondensation catalyst for either the low molecular weight amorphous polyester resin include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts may be utilized in amounts of, for example, from about 0.01 mole percent to about 5 mole percent based on the starting diacid or diester used to generate the polyester resin.

The low molecular weight amorphous polyester resin may be a branched resin. As used herein, the terms "branched" or "branching" includes branched resin and/or cross-linked resins. Branching agents for use in forming these branched resins include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-I,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

The resulting unsaturated polyesters are reactive (for example, crosslinkable) on two fronts: (i) unsaturation sites (double bonds) along the polyester chain, and (ii) functional groups such as carboxyl, hydroxy, and the like groups amenable to acid-base reactions. In embodiments, unsaturated polyester resins are prepared by melt polycondensation or other polymerization processes using diacids and/or anhydrides and diols.

In embodiments, the low molecular weight amorphous polyester resin or a combination of low molecular weight amorphous resins may have a glass transition temperature of from about 30° C. to about 80° C., in embodiments from about 35° C. to about 70° C. In further embodiments, the combined amorphous resins may have a melt viscosity of from about 10 to about 1,000,000 Pa*S at about 130° C., in embodiments from about 50 to about 100,000 Pa*S.

The amount of the low molecular weight amorphous polyester resin in a toner particle of the present disclosure, whether in any core, any shell, or both, may be present in an amount of from 25 to about 50 percent by weight, in embodiments from about 30 to about 45 percent by weight, and in embodiments from about 35 to about 43 percent by weight, of the toner particles (that is, toner particles exclusive of external additives and water).

In embodiments, the toner composition includes at least one crystalline resin. As used herein, "crystalline" refers to a polyester with a three dimensional order. "Semicrystalline resins" as used herein refers to resins with a crystalline percentage of, for example, from about 10 to about 90%, in embodiments from about 12 to about 70%. Further, as used hereinafter "crystalline polyester resins" and "crystalline resins" encompass both crystalline resins and semicrystalline resins, unless otherwise specified.

In embodiments, the crystalline polyester resin is a saturated crystalline polyester resin or an unsaturated crystalline polyester resin.

The crystalline polyester resins, which are available from a number of sources, may possess various melting points of, for example, from about 30° C. to about 120° C., in embodiments from about 50c'C to about 90° C. The crystalline resins may have, for example, a number average molecular weight (Mn), as measured by gel permeation chromatography (GPC) of, for example, from about 1,000 to about 50,000, in embodiments from about 2,000 to about 25,000, in embodiments from about 3,000 to about 15,000, and in embodiments from about 6,000 to about 12,000. The weight average molecular weight ($M_w$) of the resin is 50,000 or less, for example, from about 2,000 to about 50,000, in embodiments from about 3,000 to about 40,000, in embodiments from about 10,000 to about 30,000 and in embodiments from about 21,000 to about 24,000, as determined by GPC using polystyrene standards. The molecular weight distribution ($M_w/M_n$) of the crystalline resin is, for example, from about 2 to about 6, in embodiments from about 3 to about 4. The crystalline polyester resins may have an acid value of about 2 to about 20 mg KOH/g, in embodiments from about 5 to about 15 mg KOH/g, and in embodiments from about 8 to about 13 mg KOH/g.

Illustrative examples of crystalline polyester resins may include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-siiccinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate)₅ poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fiimarate), poly(octylene-fumarate), poly(nonylene-fumarate), poly(decylene-fiimarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5- sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate) and combinations thereof.

The crystalline resin may be prepared by a polycondensation process by reacting suitable organic diol(s) and suitable organic diacid(s) in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and may be selected in an amount, for example, of from about 0.01 to about 1 mole percent of the resin. Additionally, in place of the organic diacid, an organic diester can also be selected, and where an alcohol byproduct is generated. In further embodiments, the crystalline polyester resin is a poly(dodecandioicacid-co-nonanediol).

Examples of organic diols selected for the preparation of crystalline polyester resins include aliphatic diols with from about 2 to about 36 carbon atoms, such as 1,2-ethanediol, 1,3-propanediol, 1,4-butanediol, 1,5-pentanedial, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfa-1,2-ethanediol, lithio 2-sulfo-I,2-ethanediol, potassio 2-sulfo-I,2-ethanediol, sodio 2-sulfa-I,3-propanediol, lithio 2-sulfo-1,3-propanediol, potassio 2-sulfo-I,3-propanediol, mixture thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

Suitable crystalline polyester resins include those disclosed in U.S. Pat. No. 7,329,476 and U.S. Patent Application Pub. Nos. 2006/0216626, 2008/0107990, 2008/0236446 and 2009/0047593, each of which is hereby incorporated by reference in their entirety. In embodiments, a suitable crystalline resin may include a resin composed of ethylene glycol or nonanediol and a mixture of dodecanedioic acid and fumaric acid co-monomers with the following formula (II):

$$\left\{\begin{matrix}O\\\|\\C\end{matrix}(CH_2)_{10}\begin{matrix}O\\\|\\C\end{matrix}\right\}_b\left\{O(CH_2)_9O\right\}_d \tag{II}$$

wherein b is from about 5 to about 2000, and d is from about 5 to about 2000.

If semicrystalline polyester resins are employed herein, the semicrystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly (decamethylene adipate), poly(decamethylene azelaate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxyvalerate), poly(hexamethylene-4,4'-oxydibenzoate), poly (l0-hydroxy capric acid), poly(isophthalaldehyde), poly(octamethylene dodecanedioate), poly(dimethyl siloxane), poly (dipropyl siloxane), poly(tetramethylene phenylene diacetate), poly(tetramethylene trithiodicarboxylate), poly (trimethylene dodecane dioate), poly(m-xylene), poly(p-xylylene pimelamide), and combinations thereof.

The amount of the crystalline polyester resin in a toner particle of the present disclosure, whether in core, shell or both, may be present in an amount of from 1 to about 15 percent by weight, in embodiments from about 5 to about 10 percent by weight, and in embodiments from about 6 to about 8 percent by weight, of the toner particles (that is, toner particles exclusive of external additives and water).

In embodiments, a toner of the present disclosure may also include at least one high molecular weight branched or cross-linked amorphous polyester resin. This high molecular weight resin may include, in embodiments, for example, a branched amorphous resin or amorphous polyester, a cross-linked amorphous resin or amorphous polyester, or mixtures thereof, or a non-cross-linked amorphous polyester resin that has been subjected to cross-linking. In accordance with the present disclosure, from about 1% by weight to about 100% by weight of the high molecular weight amorphous polyester resin may be branched or cross-linked, in embodiments from about 2% by weight to about 50% by weight of the higher molecular weight amorphous polyester resin may be branched or cross-linked.

As used herein, the high molecular weight amorphous polyester resin may have, for example, a number average molecular weight ($M_n$), as measured by gel permeation chromatography (GPC) of, for example, from about 1,000 to about 10,000, in embodiments from about 2,000 to about 9,000, in embodiments from about 3,000 to about 8,000, and in embodiments from about 6,000 to about 7,000. The weight average molecular weight ($M_w$) of the resin is greater than 55,000, for example, from about 55,000 to about 150,000, in embodiments from about 60,000 to about 100,000, in embodiments from about 63,000 to about 94,000, and in embodiments from about 68,000 to about 85,000, as determined by GPC using polystyrene standard. The polydispersity index (PD) is above about 4, such as, for example, greater than about 4, in embodiments from about 4 to about 20, in embodiments from about 5 to about 10, and in embodiments from about 6 to about 8, as measured by GPC versus standard polystyrene reference resins. The PD index is the ratio of the weight-average molecular weight ($M_w$) and the number-average molecular weight (Mn). The low molecular weight amorphous polyester resins may have an acid value of from about 8 to about 20 mg KOH/g, in embodiments from about 9 to about 16 mg KOH/g, and in embodiments from about 11 to about 15 mg KOH/g. The high molecular weight amorphous polyester resins, which are available from a number of sources, can possess various melting points of, for example, from about 30° C. to about 140° C., in embodiments from about 75° C. to about 130° C., in embodiments from about 100° C. to about 125° C., and in embodiments from about 115° C. to about 121° C.

The high molecular weight amorphous resins, which are available from a number of sources, can possess various onset glass transition temperatures (Tg) of, for example, from about 40° C. to about 80° C., in embodiments from about 50° C. to about 70° C., and in embodiments from about 54° C. to about 68° C., as measured by differential scanning calorimetry (DSC). The linear and branched amorphous polyester resins, in embodiments, may be a saturated or unsaturated resin.

The high molecular weight amorphous polyester resins may be prepared by branching or cross-linking linear polyester resins. Branching agents can be utilized, such as trifunctional or multifunctional monomers, which agents usually increase the molecular weight and polydispersity of the polyester. Suitable branching agents include glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, combinations thereof, and the like. These branching agents can be utilized in effective amounts of from about 0.1 mole percent to about 20 mole percent based on the starting diacid or diester used to make the resin.

Compositions containing modified polyester resins with a polybasic carboxylic acid which may be utilized in forming high molecular weight polyester resins include those disclosed in U.S. Pat. No. 3,681,106, as well as branched or cross-linked polyesters derived from polyvalent acids or alcohols as illustrated in U.S. Pat. Nos. 4,863,825; 4,863,824; 4,845,006; 5,143,809; 5,057,596; 4,988,794; 4,981,939; 4,980,448; 4,933,252; 4,931,370; 4,917,983 and 4,973,539, the disclosures of each of which are incorporated by reference herein in their entirety.

In embodiments, cross-linked polyesters resins may be made from linear amorphous polyester resins that contain sites of unsaturation that can react under free-radical conditions. Examples of such resins include those disclosed in U.S. Pat. Nos. 5,227,460; 5,376,494; 5,480,756; 5,500,324; 5,601,960; 5,629,121; 5,650,484; 5,750,909; 6,326,119; 6,358,657; 6,359,105; and 6,593,053, the disclosures of each of which are incorporated by reference in their entirety. In embodiments, suitable unsaturated polyester base resins may be prepared from diacids and/or anhydrides such as, for example, maleic anhydride, terephthalic acid, trimellitic acid, fumaric acid, and the like, and combinations thereof, and diols such as, for example, bisphenol-A ethyleneoxide adducts, bisphenol A-propylene oxide adducts, and the like, and combinations thereof. In embodiments, a suitable polyester is poly(propoxylated bisphenol A co-fumaric acid).

In embodiments, a cross-linked branched polyester may be utilized as a high molecular weight amorphous polyester resin. Such polyester resins may be formed from at least two pre-gel compositions including at least one polyol having two or more hydroxyl groups or esters thereof, at least one aliphatic or aromatic polyfunctional acid or ester thereof, or a mixture thereof having at least three functional groups; and optionally at least one long chain aliphatic carboxylic acid or ester thereof, or aromatic monocarboxylic acid or ester thereof, or mixtures thereof. The two components may be reacted to substantial completion in separate reactors to produce, in a first reactor, a first composition including a pre-gel having carboxyl end groups, and in a second reactor, a second composition including a pre-gel having hydroxyl end groups. The two compositions may then be mixed to create a cross-linked branched polyester high molecular weight resin. Examples of such polyesters and methods for their synthesis include those disclosed in U.S. Pat. No. 6,592,913, the disclosure of which is hereby incorporated by reference in its entirety.

Suitable polyols may contain from about 2 to about 100 carbon atoms and have at least two or more hydroxyl groups, or esters thereof. Polyols may include glycerol, pentaerythritol, polyglycol, polyglycerol, and the like, or mixtures thereof. The polyol may include a glycerol Suitable esters of glycerol include glycerol palmitate, glycerol sebacate, glycerol adipate, triacetin tripropionin, and the like. The polyol may be present in an amount of from about 20% to about 30% weight of the reaction mixture, in embodiments, from about 22% to about 26% weight of the reaction mixture.

Aliphatic polyfunctional acids having at least two functional groups may include saturated and unsaturated acids containing from about 2 to about 100 carbon atoms, or esters thereof, in some embodiments, from about 4 to about 20 carbon atoms. Other aliphatic polyfunctional acids include malonic, succinic, tartaric, malic, citric, fumaric, glutaric, adipic, pimelic, sebacic, suberic, azelaic, sebacic, and the like, or mixtures thereof. Other aliphatic polyfunctional acids which may be utilized include dicarboxylic acids containing a C3 to Q cyclic structure and positional isomers thereof, and include cyclohexane dicarboxylic acid, cyclobutane dicarboxylic acid or cyclopropane dicarboxylic acid.

Aromatic polyfunctional acids having at least two functional groups which may be utilized include terephthalic, isophthalic, trimellitic, pyromellitic and naphthalene 1,4-, 2,3-, and 2,6-dicarboxylic acids.

The aliphatic polyfunctional acid or aromatic polyfunctional acid may be present in an amount of from about 40% to about 65% weight of the reaction mixture, in embodiments, from about 44% to about 60% weight of the reaction mixture.

Long chain aliphatic carboxylic acids or aromatic monocarboxylic acids may include those containing from about 12 to about 26 carbon atoms, or esters thereof, in embodiments, from about 14 to about 18 carbon atoms. Long chain aliphatic carboxylic acids may be saturated or unsaturated. Suitable saturated long chain aliphatic carboxylic acids may include lauric, myristic, palmitic, stearic, arachidic, cerotic, and the like, or combinations thereof. Suitable unsaturated long chain aliphatic carboxylic acids may include dodecylenic, palmitoleic, oleic, linoleic, linolenic, erucic, and the like, or combinations thereof. Aromatic monocarboxylic acids may include benzoic, naphthoic, and substituted naphthoic acids. Suitable substituted naphthoic acids may include naphthoic acids substituted with linear or branched alkyl groups containing from about 1 to about 6 carbon atoms such as 1-methyl-2 naphthoic acid and/or 2-isopropyl-1-naphthoic acid. The long chain aliphatic carboxylic acid or aromatic monocarboxylic acids may be present in an amount of from about 0% to about 70% weight of the reaction mixture, in embodiments, of from about 15% to about 30% weight of the reaction mixture.

Additional polyols, ionic species, oligomers, or derivatives thereof, may be used if desired. These additional glycols or polyols may be present in amounts of from about 0% to about 50% weight percent of the reaction mixture. Additional polyols or their derivatives thereof may include propylene glycol, 1,3-butanediol, 1,3-propanediol, 1,4-butanediol, 1,6-hexanediol diethylene glycol, 1,4-cyclohexanediol, 1,4-cyclohexanedimethanol, neopentyl glycol, triacetin, trimethylolpropane, pentaerythritol, cellulose ethers, cellulose esters, such as cellulose acetate, sucrose acetate iso-butyrate and the like.

In embodiments, the cross-linked branched polyesters for the high molecular weight amorphous polyester resin may include those resulting from the reaction of dimethylterephthalate, 1,3-butanediol, 1,2-propanediol, and pentaerythritol.

In embodiments, the high molecular weight resin, for example a branched polyester, may be present on the surface of toner particles of the present disclosure. The high molecular weight resin on the surface of the toner particles may also be particulate in nature, with high molecular weight resin particles having a diameter of from about 100 nanometers to about 300 nanometers, in embodiments from about 110 nanometers to about 150 nanometers.

The amount of high molecular weight amorphous polyester resin in a toner particle of the present disclosure, whether in any core, any shell, or both, may be from about 25% to about 50% by weight of the toner, in embodiments from about 30% to about 45% by weight, in other embodiments or from about 40% to about 43% by weight of the toner (that is, toner particles exclusive of external additives and water).

The ratio of crystalline resin to the low molecular weight amorphous resin to high molecular weight amorphous polyester resin can be in the range from about 1:1:98 to about 98:1:1 to about 1:98:1, in embodiments from about 1:5:5 to about 1:9:9, in embodiments from about 1:6:6 to about 1:8:8.

Surfactants

In embodiments, resins, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, Cn trimethyl ammonium bromides, halide salts of quatemized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Colorants

The latex particles produced as described above may be added to a colorant to produce a toner. In embodiments the colorant may be in a dispersion. The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. Suitable surfactants include any of those surfactants described above. In embodiments, the surfactant may be ionic and may be present in a dispersion in an amount from about 0.1 to about 25 percent by weight of the colorant, and in embodiments from about 1 to about 15 percent by weight of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants, and the like.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™ PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33,2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight of the toner, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant.

In embodiments, toners of the present disclosure may have high pigment loadings. As used herein, high pigment loadings include, for example, toners having a colorant in an amount of from about 4 percent by weight of the toner to about 40 percent by weight of the toner, in embodiments from about 5 percent by weight of the toner to about 15 percent by weight of the toner. These high pigment loadings may be important for certain colors such as Magenta, Cyan, Black, PANTONE® Orange, Process Blue, PANTONE® yellow, and the like. (The PANTONE® colors refer to one of the most popular color guides illustrating different colors, wherein each color is associated with a specific formulation of colorants, and is published by PANTONE, Inc., of Moonachie, N.J.) One issue with high pigment loading is that it may reduce the ability of the toner particles to spherodize, that is, to become circular, during the coalescence step, even at a very low pH.

The resulting latex, optionally in a dispersion, and colorant dispersion may be stirred and heated to a temperature of from about 35° C. to about 70° C., in embodiments of from about 40° C. to about 65° C., resulting in toner aggregates of from about 2 microns to about 10 microns in volume average diameter, and in embodiments of from about 5 microns to about 8 microns in volume average diameter.

Wax

Optionally, a wax may also be combined with the resin in forming toner particles. When included, the wax may be present in an amount of, for example, from about 1 weight percent to about 25 weight percent of the toner particles, in embodiments from about 5 weight percent to about 20 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™ a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents.

Toner Preparation

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion-aggregation processes, such as a process that includes aggregating a mixture of an optional wax and any other desired or required additives, and emulsions including the resins described above, optionally in surfactants as described above, and then coalescing the aggregate mixture. A mixture may be prepared by adding an optional wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

In order to control aggregation and coalescence of the particles, in embodiments the aggregating agent may be metered into the mixture over time. For example, the agent may be metered into the mixture over a period of from about 5 to about 240 minutes, in embodiments from about 30 to about 200 minutes. The addition of the agent may also be done while the mixture is maintained under stirred conditions, in embodiments from about 50 rpm to about 1,000 rpm, in other embodiments from about 100 rpm to about 500 rpm, and at a temperature that is below the glass transition temperature of the resin as discussed above, in embodiments from about 30° C. to about 90° C., in embodiments from about 35°C to about 70° C.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Shell Resin

In embodiments, after aggregation, but prior to coalescence, a shell may be applied to the aggregated particles.

Resins which may be utilized to form the shell include, but are not limited to, the amorphous resins described above for use in the core. Such an amorphous resin may be a low molecular weight resin, a high molecular weight resin, or combinations thereof. In embodiments, an amorphous resin which may be used to form a shell in accordance with the present disclosure may include an amorphous polyester of formula I above.

In some embodiments, the amorphous resin utilized to form the shell may be crosslinked. For example, crosslinking may be achieved by combining an amorphous resin with a crosslinker, sometimes referred to herein, in embodiments, as an initiator. Examples of suitable crosslinkers include, but are not limited to, for example free radical or thermal initiators such as organic peroxides and azo compounds described above as suitable for forming a gel in the core. Examples of suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di (2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di (t-butyl peroxy) hexane, t-butyl cumyl peroxide, a-a-bis(t-butyl peroxy) diisopropyl benzene, di-t-butyl peroxide and 2,5-dimethyl 2,5di (t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di (t-butyl peroxy) valerate, 1,1-di (t-butyl peroxy) 3,3,5-trimethyl cyclohexane, 1,1-di (t-butyl peroxy) cyclohexane, 1,1-di (t-amyl peroxy) cyclohexane, 2,2-di (t-butyl peroxy) butane, ethyl 3,3-di (t-butyl peroxy) butyrate and ethyl 3,3-di (t-amyl peroxy) butyrate, and combinations thereof. Examples of suitable azo compounds include 2,2,'-azobis(2,4-dimethylpentane nitrile), azobis-isobutyronitrile, 2,2'-azobis (isobutyronitrile), 2,2'-azobis (2,4-dimethyl valeronitrile), 2,2'-azobis (methyl butyronitrile), I,r-azobis (cyano cyclohexane), other similar known compounds, and combinations thereof.

The crosslinker and amorphous resin may be combined for a sufficient time and at a sufficient temperature to form the crosslinked polyester gel. In embodiments, the crosslinker and amorphous resin may be heated to a temperature of from about 25° C. to about 99° C., in embodiments from about 30° C. to about 95° C., for a period of time from about 1 minute to about 10 hours, in embodiments from about 5 minutes to about 5 hours, to form a crosslinked polyester resin or polyester gel suitable for use as a shell.

Where utilized, the crosslinker may be present in an amount of from about 0.001% by weight to about 5% by weight of the resin, in embodiments from about 0.01% by weight to about 1% by weight of the resin. The amount of CCA may be reduced in the presence of crosslinker or initiator.

A single polyester resin may be utilized as the shell or, as noted above, in embodiments a first polyester resin may be combined with other resins to form a shell. Multiple resins may be utilized in any suitable amounts. In embodiments, a first amorphous polyester resin, for example a low molecular weight amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments a second resin, in embodiments a high molecular weight amorphous resin, may be present in the shell resin in an amount of from about 0 percent by weight to about 80 percent by weight of the total shell resin, in embodiments from about 10 percent by weight to about 70 percent by weight of the shell resin.

Coalescence

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example to from about 100 rpm to about 400 rpm, in embodiments from about 200 rpm to about 300 rpm. The fused particles can be measured for shape factor or circularity, such as with a SYSMEX FPIA 2100 analyzer, until the desired shape is achieved.

Coalescence may be accomplished over a period of time from about 0.01 to about 9 hours, in embodiments from about 0.1 to about 4 hours.

Subsequent Treatments

In embodiments, after aggregation and/or coalescence, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The mixture may be cooled, washed and dried. Cooling may be at a temperature of from about 20° C. to about 40° C., in embodiments from about 22° C. to about 30° C., over a period of time from about 1 hour to about 8 hours, in embodiments from about 1.5 hours to about 5 hours.

In embodiments, cooling a coalesced toner slurry may include quenching by adding a cooling media such as, for example, ice, dry ice and the like, to effect rapid cooling to a temperature of from about 20° C. to about 40° C., in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture may not be feasible or practical, neither by the introduction of a cooling medium into the toner mixture, or by the use of jacketed reactor cooling.

Subsequently, the toner slurry may be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

Additives

In embodiments, toner particles may contain the polymeric composition of the present disclosure described above, as well as other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents may be applied simultaneously with the shell resin described above or after application of the shell resin.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof.

In general, silica may be applied to the toner surface for toner flow, triboelectric charge enhancement, admix control, improved development and transfer stability, and higher toner blocking temperature. Titania may be applied for improved relative humidity (RH) stability, triboelectric charge control and improved development and transfer stability. Zinc stearate, calcium stearate and/or magnesium stearate may optionally also be used as an external additive for providing lubricating properties, developer conductivity, triboelectric charge enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

Each of these external additives may be present in an amount from about 0 weight percent to about 3 weight percent of the toner, in embodiments from about 0.25 weight percent to about 2.5 weight percent of the toner, although the amount of additives can be outside of these ranges. In embodiments, the toners may include, for example, from about 0 weight percent to about 3 weight percent titania, from about 0 weight percent to about 3 weight percent silica, and from about 0 weight percent to about 3 weight percent zinc stearate.

Suitable additives include those disclosed in U.S. Pat. Nos. 3,590,000, and 6,214,507, the disclosures of each of which are hereby incorporated by reference in their entirety. Again, these additives may be applied simultaneously with the shell resin described above or after application of the shell resin.

In embodiments, in addition to the polymeric additive of the present disclosure, toner particles may also possess silica in amounts of from about 0.1% to about 5% by weight of the toner particles, in embodiments from about 0.2% to about 2% by weight of the toner particles, and titania in amounts of from about 0% to about 3% by weight of the toner particles, in embodiments from about 0.1% to about 1% by weight of the toner particles.

In embodiments, toners of the present disclosure may be utilized as ultra low melt (ULM) toners. In embodiments, the dry toner particles having a core and/or shell may, exclusive of external surface additives, have one or more the following characteristics:

(1) Volume average diameter (also referred to as "volume average particle diameter") of from about 3 to about 25 pm, in embodiments from about 4 to about 15 pm, in other embodiments from about 5 to about 12 pm.

(2) Number Average Geometric Size Distribution (GSDn) and/or Volume Average Geometric Size Distribution (GSDv): In embodiments, the toner particles described in (1) above may have a narrow particle size distribution with a lower number ratio GSD of from about 1.15 to about 1.38, in other embodiments, less than about 1.31. The toner particles of the present disclosure may also have a size such that the upper GSD by volume in the range of from about 1.20 to about 3.20, in other embodiments, from about 1.26 to about 3.11. Volume average particle diameter D50V, GSDv, and GSDn may be measured by means of a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3.

(3) Shape factor of from about 105 to about 170, in embodiments, from about 110 to about 160, SFI*a. Scanning electron microscopy (SEM) may be used to determine the shape factor analysis of the toners by SEM and image analysis (IA). The average particle shapes are quantified by employing the following shape factor (SFI*a) formula:

$$SFI^*a = 100 \pi i d^2/(4A),  \quad (IV)$$

where A is the area of the particle and d is its major axis. A perfectly circular or spherical particle has a shape factor of exactly 100. The shape factor SFI*a increases as the shape becomes more irregular or elongated in shape with a higher surface area.

(4) Circularity of from about 0.92 to about 0.99, in other embodiments, from about 0.94 to about 0.975. The instrument used to measure particle circularity may be an FPIA-2100 manufactured by SYSMEX, following the manufacturer's instructions.

The characteristics of the toner particles may be determined by any suitable technique and apparatus and are not limited to the instruments and techniques indicated hereinabove.

Developers

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™ and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments from about 0.5 to about 2% by weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 to about 10 percent by weight, in embodiments from about 0.01 percent to about 3 percent by weight, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 pm in size, in embodiments from about 50 to about 75 pm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

Imaging

The toners can be utilized for electrostatographic or electrophotographic processes, including those disclosed in U.S. Pat. No. 4,295,990, the disclosure of which is hereby incorporated by reference in its entirety. In embodiments, any known type of image development system may be used in an image developing device, including, for example, magnetic brush development, jumping single-component development, hybrid scavengeless development (HSD), and the like. These and similar development systems are within the purview of those skilled in the art.

Imaging processes include, for example, preparing an image with an electrophotographic device including a charging component, an imaging component, a photoconductive component, a developing component, a transfer component, and a fusing component. In embodiments, the development component may include a developer prepared by mixing a carrier with a toner composition described herein. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments from about 80° C. to about 150° C._5 in other embodiments from about 90° C. to about 140° C., after or during melting onto the image receiving substrate.

In embodiments where the toner resin is crosslinkable, such crosslinking may be accomplished in any suitable manner. For example, the toner resin may be crosslinked during fusing of the toner to the substrate where the toner resin is crosslinkable at the fusing temperature. Crosslinking also may be effected by heating the fused image to a temperature at which the toner resin will be crosslinked, for example in a post-fusing operation. In embodiments, crosslinking may be effected at temperatures of from about 160° C. or less, in embodiments from about 70° C. to about 160° C., in other embodiments from about 80° C. to about 140° C.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Examples 1-5: Polycyclohexylmethacrylate Latexes were Prepared Containing Varying Amounts of the Polymeric Composition of the Present Disclosure Comparative Example 1: Preparation of Control Latex (Containing an Untreated Polymeric Additive)

The polymeric latex was synthesized by a semicontinuous starve-fed emulsion polymerization process. An emulsified monomer mixture was prepared in a portable tank by mixing monomers, 3.064 kg cyclohexyl methacrylate (CHMA), 1.035 divinylbenzene 55% technical grade (DVB-55), and 41.41 g 2-(dimethylamino)ethyl methacrylate (DMAEMA) into a surfactant solution containing 35.13 g sodium lauryl sulfate (SLS) and 4.588 kg deionized water.

A separate aqueous phase mixture was prepared in a 5-gallon reaction vessel by mixing 8.21 g SLS with 9.069 kg deionized water which was then heated to 75° C. with continuous mixing at 225 rpm. A polymer seed was prepared by adding 5% of the emulsified monomer into the reactor and mixing for a minimum of 15 minutes. After the reactor's temperature reached around 75° C., the initiator solution of 0.143 kg deionized water and 15.57 g ammonium persulfate (APS) were added over 7 minutes to polymerize the seed particles. Following a 15 min wait time, the remaining emulsified monomer was added at a controlled feed rate to the reactor over a two hours period to polymerize and grow the polymer seed particles. Once the monomer feeding is complete, the reactor was held at the reaction temperature for an extra hour, followed by a post reaction heat treatment at an elevated temperature of 80° C. for an additional 2 hours to lower the residual monomers levels. During the post reaction process the latex was buffered with 0.1 M sodium hydroxide (NaOH) solution to maintain pH>5.5. The latex was then cooled to room temperature and discharged through 1 micron filter bags. The resulting product was an aqueous polymer latex that contains about 23 wt % solids. The final particle size of the latex was 100 nm.

A sample of polycyclohexylmethacrylate latex was spray dried using a dual liquid nozzle DL41 spray dryer from Yamato Scientific Co. with drying conditions using an atomizing pressure of 4 kgf/cm$^2$, a sample feed rate setting of 3, a temperature of 140° C., an aspirator flow rate of 4 m$^3$/min. The final dried Control latex particle was about 100 nm in size (measured in particle diameter).

Example 2: Preparation of Polymeric Composition 2 (Surface Treated Polymeric Additive with 3 wt % Water Dispersible Silicone-Polyether Copolymer—Silsurf C410)

A 500 gram sample of the wet latex (prior to drying) of Comparative Example 1 was weighed using a Mettler Toledo PB3002-S lab scale. To the wet latex, a pre-calculated mass of 3 weight % of the silicone polyether Silsurf C410, 15 grams, was added to the latex using a transfer pipette while mixing with a magnet stirrer for at least 15 minutes. The sample was then spray dried following the procedure as described in Comparative Example 1.

Example 3: Preparation of Polymeric Composition 3 (Surface Treated Polymeric Additive with 2 wt % Water-Soluble Silicone-Polyether Copolymer—Silsurf D212CG)

A 500 gram sample of the wet latex of Comparative Example 1 was weighed using a Mettler Toledo PB3002-S lab scale. To the latex, a pre-calculated mass of 2 weight % of the silicone polyether Silsurf D212CG, 10 grams, was added to the latex using a transfer pipette while mixing with a magnet stirrer for at least 15 minutes. The sample was then spray dried following the procedure as described in Comparative Example 1.

Example 4: Preparation of Polymeric Composition 4 (Surface Treated Polymeric Additive with 2 wt % Water Soluble Silicone-Polyether Copolymer—Silsurf J1015-O)

A 500 gram sample of the wet latex of Comparative Example 1 was weighed using a Mettler Toledo PB3002-S lab scale. To the latex, a pre-calculated mass of 2 weight % of the silicone polyether Silsurf J1015-O, 10 grams, was added to the latex using a transfer pipette while mixing with a magnet stirrer for at least 15 minutes. The sample was then spray dried as described in Comparative Example 1.

Example 5: Preparation of Polymeric Composition 5 (Surface Treated Polymeric Additive with 1 wt % Water Soluble Silicone-Polyether Copolymer—Silsurf J1015-O)

A 500 gram sample of the wet latex of Comparative Example 1 was weighed using a Mettler Toledo PB3002-S lab scale. To the latex, a pre-calculated mass of 1 weight % of the silicone polyether Silsurf J1015-O, 5 grams, was added to the latex using a transfer pipette while mixing with a magnet stirrer for at least 15 minutes. The sample was then spray dried as described in Comparative Example 1.

X-ray Photoelectron Spectroscopic data (XPS) was obtained for each of the silicone polyether copolymer samples as tabulated in Table 1. The XPS data shows the measured atom % carbon, oxygen and silicon at the surface of the material, and also the calculated ratio of the atom % carbon to oxygen and carbon to silicon. The Si measured by XPS was in the silicone region 102.2 eV, which indicates Si in a silicone structure. Not to be limited by theory, but it is believed that if the C/O ratio of the silicone polyether is too high (e.g., C/O ratio higher than about 3) the copolymer will be difficult to disperse or dissolve in water. In addition, due to the known good lubrication properties of the silicone segment of the silicone polyether, it is desirable to include a sufficient amount of Si in the silicone polyether, in embodiments greater than about 5% atom % Si as measured by XPS. Silicone is hydrophobic, so again if Si in the silicone polyether is too high, in embodiments greater than 20 atom % Si as measured by XPS, then the silicone polyether will be difficult to disperse or dissolve in the aqueous phase. For the silicon polyethers of certain embodiments of this invention, the C/O ratio is from 1.98 to 2.33, and the silicon atom % is from 11.4 to about 14.6%.

TABLE 1

| Silicon Polyether | C (atom %) | O (atom %) | Si (atom %) | C/O |
|---|---|---|---|---|
| C410 | 58.8 | 29.7 | 11.5 | 1.98 |
| D212-CG | 58.2 | 27.2 | 14.6 | 2.14 |
| J1015-O | 62.0 | 26.6 | 11.4 | 2.33 |

XPS data was also obtained for each of the silicone polyether copolymer treated cross-linked latexes of Comparative Example 1, Examples 2, 3 and 5 as tabulated in Table 2. For the additives in Table 2, the XPS shows the surface composition of the additive. The atom % Si measured by XPS for the samples in Table 2 was in the silicone region of 102.2 eV, that is, Si in a silicone structure. Not to be limited by theory, but it is believed that a higher C/O ratio will provide better reduced relative humidity sensitivity of performance, in particular an additive surface with a lower C/O ratio may show poor low charging in A-zone, especially if the C/O ratio is less than 4. All surface treated additives in the Examples in Table 2 show a C/O ratio of greater than 4. It is also desirable to include a sufficient amount of silicone for purpose of adding the benefit of lubrication. The Comparative Example 1 contains a small amount of silicone, only 0.19 atom %; Examples 2, 3 and 5 contain a significantly higher amount of Si in the silicone structure.

TABLE 2

| Additive | Additive Surface Treatment | C (at %) | O (atom %) | Si (atom %) | C/O |
|---|---|---|---|---|---|
| Comparative Example 1 | None | 85.76 | 13.81 | 0.19 | 6.21 |
| Example 2 | C410 | 77.27 | 18.58 | 3.82 | 4.16 |
| Example 3 | D212CG | 80.88 | 16.57 | 2.26 | 4.88 |
| Example 5 | J2015-O | 83 | 15.76 | 1.05 | 5.27 |

Toner Blends

For each of the Control Latex (Example 1) and Polymeric Compositions of Examples 2 to 5, toner blends were prepared by blending each of Examples 1-5 in turn onto XEROX 700 digital Color Press cyan toner particles. For each toner blend, the Control Latex/Polymeric Compositions were added at a loading of 0.87% weight percent per weight of toner particles. Each toner blend also contains the following components by weight of toner particles: 2.3% 40 nm silica, 0.88% 15×40 nm titania, 0.14% 1.4 micron strontium titanate, 0.09% zinc stearate. The blended toner compositions are tabulated in Table 3. Control Toner Example 6 was prepared using Control Latex 1 (Example 1). Toner Examples 7 to 10 were prepared using the Polymeric Compositions 2 to 5 (Examples 2 to 5) respectively.

Toner Evaluation

Bench developer performance was obtained for the Control Toner and the Toner Examples.

Toner Charging

Toner charging was collected for the Control Toner Example 6 and the Toner Examples 7 to 10. For each blended toner at 6 pph of toner in carrier were prepared, 1.8 grams of toner and 30 grams of Xerox 700 carrier in a 60 mL glass bottle. Samples were conditioned three days in a low-humidity zone (J zone) at 21.1° C. and 10% RH), and in a separate sample in a high humidity zone (A zone) at about 28° C./85% relative humidity. The developers with additive blended toner were charged in a Turbula mixer for 60 minutes.

The triboelectric charge of the toner was measured using a charge spectrograph using a 100 V/cm field. The toner charge (Q/D) was measured visually as the midpoint of the toner charge distribution. The charge was reported in millimeters of displacement from the zero line. (The displacement in mm can be converted to Q/D charge in femtocoulombs per micron by multiplication by 0.092 femtocoulombs/mm.)

The blended toner charge per mass ratio (Q/M) was also determined by the total blow-off charge method, measuring the charge on a faraday cage containing the developer after removing the toner by blow-off in a stream of air. The total charge collected in the cage is divided by the mass of toner removed by the blow-off, by weighing the cage before and after blow-off to give the Q/M ratio. Table 3 shows the A-zone and J-zone charge performance of the toners. The results show that there is no change in A-zone charge for Toner Example 10 (with polymeric composition (surface treated additive) that contains 1 wt % of silicone-polyether copolymer as compared to the Control Toner Example 6, but Examples 7 to 9 toners with polymeric compositions that contain a higher loading (2 wt % and 3 wt %) of silicone-polyether copolymers exhibit lower A-zone charge as compared to the Control Example 6 Toner. All of the A-zone charges are within acceptable range. For Toners containing the polymeric compositions, there appears to be no significant effect in J-zone charge as compared to control Toner.

Table 3 also shows the A-zone charge maintenance of the toners after 24 hours and after 7 days. Charge maintenance is the percentage of charge that remains in a resting charged developer after a certain period of time. It is desirable for the charge maintenance percentage to be as high as possible. The results show that higher loadings (2 wt % and 3 wt %) of treatment of silicone-polyether copolymer (Toner Examples 7-9) negatively affect the charge maintenance, but at the lower loading of 1 wt % for J1015-O (Example 10), the charge maintenance is comparable to the Control Toner. Overall, the charge maintenance for all the toners are within the acceptable range.

Toner Flow Cohesion

Two grams of the blended toner at lab ambient conditions is placed on a the top screen in a stack of three pre-weighed mesh sieves, which were stacked as follows in a Hosokawa flow tester: 53 μm on top, 45 μm in the middle, and 38 μm on the bottom. A vibration of 1 mm amplitude is applied to the stack for 90 seconds. The flow cohesion % is calculated as: % Cohesion=(50*A+30*B+10*C)

Toner Blocking

Toner blocking was determined by measuring the toner cohesion at elevated temperature above room temperature. Toner blocking measurement is completed as follows: two grams of additive toner was weighed into an open dish and conditioned in an environmental chamber at the specified elevated temperature and 50% relative humidity. After about 17 hours the samples were removed and acclimated in ambient conditions for about 30 minutes. Each re-acclimated sample was measured by sieving through a stack of two pre-weighed mesh sieves, which were stacked as follows: 1000 μm on top and 106 μm on bottom. The sieves were vibrated for about 90 seconds at about 1 mm amplitude with a Hosokawa flow tester. After the vibration was completed the sieves were reweighed and toner blocking was calculated from the total amount of toner remaining on both sieves as a percentage of the starting weight.

Toner cohesion flow and toner blocking are shown in Table 3. The toner flow of the Control Example 6 is somewhat higher than the desired value which is below about 34%. All silicone polyether treatments improve the toner flow significantly into the desired range. Blocking appears to be somewhat affected by Silsurf in all of these Example toners compared to the control Comparative Example 6, however, all blocking is very close to the Comparative Example 6 within only 1.5° C., and all are within the acceptable range of greater or equal to about 50.5° C.

TABLE 3

| Toner | Additive | Additive Surface Treatment | Additive Surface Treatment Loading (wt %) | Flow Cohesion (%) | Blocking (° C.) | Q/M (μC/g) J-zone | Q/M (μC/g) A-zone | Charge Maintenance (%) 24 hours | Charge Maintenance (%) 7 days |
|---|---|---|---|---|---|---|---|---|---|
| Comparative Example 6 | Comparative Example 1 | none | none | 47 | 52.2 | 56 | 26 | 89 | 71 |
| Example 7 | Example 2 | C410 | 3 | 16 | 50.7 | 50 | 16 | 71 | 45 |
| Example 8 | Example 3 | D212CG | 2 | 18 | 51.3 | 52 | 17 | 73 | 51 |
| Example 9 | Example 4 | J1015-O | 2 | 24 | 51.0 | 57 | 22 | 76 | 52 |
| Example 10 | Example 5 | J1015-O | 1 | 29 | 51.1 | 59 | 26 | 88 | 71 |

Machine Testing

Machine testing was performed in a Xerox 700 on Toner Examples 2, 4 and 5 in both the J-zone and the A-zone using Xerox 700 carrier. For each test, 1000 prints were made at 20% area coverage (AC) to break in the test toner, maintaining a 10 min toner age (TA). Prints were made at 0.4% AC with test toner to increase the mean toner age from about 10 min to about 115 min. Toner charge $At=(TC+4)\cdot(Q/M)$, where Q/M is in units of microcoulombs/gram Toner Concentration (TC), 1st and 2nd transfer efficiency (TE), charge-up, which is the difference in At charge at 115 min. of toner age compared to 10 min and Image Quality (IQ) at both 10 min. and 115 min. of toner age (TA). For IQ, the mottle, graininess, background and halftone starvation were all evaluated to confirm they provided good quality, with no serious defects that would be readily apparent on visual inspection. A summary of results is shown below.

Table 4 shows the machines testing results in the J-zone. It is observed that the At charge (both Initial At and Aged At) of the Toner Examples remained within the target range. The overall charge-up was low for all, indicating the charge was very stable throughout the test. The $1^{st}$ transfer efficiency for all Toners were within the target range. The $2^{nd}$ transfer efficiency was observed to be slightly lower than the control toner of comparative Example 1 for Toner Examples 7 and 9, though the difference was very small and still showing good performance close to the target range (which include a polymeric composition having a lower loading of 2 or 3 wt % of a silicone-polyether copolymer). The $2^{nd}$ transfer efficiency for Example 5 was within the Eco Toner range. All Toner Examples demonstrate good and similar Image Quality with no obvious print defects.

A system contamination test was also performed in the Xerox 700 to evaluate the contamination of the PR, the bias charging roll (BCR), and the foam roller that cleans the BCR. In addition the printed images were visually inspected for banding. The test is an extreme test originally developed to stress cleaning to evaluate the effectiveness of cleaning the PR and BCR. The cyan toners tested are shown in Table 6. The test was run at 28° C. and 85% RH and in a separate test was run at 21° C. and 10% RH. In both cases, the test was run by printing in portrait mode a 8½×11 inch page with the stripe of process cyan (50% cyan, and 5% each of magenta, yellow and black) running the full width of the page, but with a width of 9 cm in the vertical dimension. In this way, a 9 cm width of the photoreceptor, BCR and BCR foam rolls for the cyan station are thus exposed to a continuous patch of 50% cyan, while the remainder of the rolls is not exposed to a toner image. The test is stopped every 3 kprint to visually inspect the PR, the BCR and the BCR foam rolls for any contamination within the area exposed to the toner patch. Also a visual inspection of the prints. The test continues until a total of 9 kprints have been made in each zone. The results of the tests are shown in Table 6. The most visible result of contamination is streaks on the print, so this is the worst defect. The second worst defect is photoreceptor contamination as this often leads ultimately to streaks on the print. Less important is BCR

TABLE 4

Machine Testing in J-zone

| | Initial At (TA = 10 min) | Aged At (TA = 115 min) | Charge-up (115 min – 10 min) | $2^{nd}$ TE (115 min) | $1^{st}$ TE (115 min) | IQ (TA = 10 min) | IQ (TA = 115 min) |
|---|---|---|---|---|---|---|---|
| Target | 500-700 | | ≤60 | ≥0.91 | ≥0.94 | Good | Good |
| Comparative Example 6 Control Toner | 578 | 575 | −4 | 0.92 | 0.99 | Good | Good |
| Toner Example 7 | 510 | 553 | 43 | 0.88 | 0.99 | Good | Good |
| Toner Example 9 | 547 | 581 | 33 | 0.87 | 0.96 | Good | Good |
| Toner Example 10 | 612 | 639 | 27 | 0.94 | 0.97 | Good | Good |

Table 5 shows the machine testing results in the A-zone. The At charge (both Initial At and Aged At of the Toner Examples 7 and 9 were lower (below the target lower limits of the Eco Toner range), but the At charge for Toner Example 10 was within the Eco Toner range. All toners showed good charge-up, showing very stable charge.

Both the $1^{st}$ and $2^{nd}$ transfer efficiency for all toners were within the Eco Toner range. All Toner Examples demonstrated similar good Image Quality, aside from a higher mottle at the highest toner age for Toner Example 9.

contamination, though if BCR contamination gets very bad it can lead to streaks on the print. Finally, contamination on the foam is not very important, as it is the function of the foam to clean the BCR, so foam contamination is preferable to BCR contamination. In all cases, either no defect was visible, denoted by "- -" in the table, or the defect was slightly visible (SV), which means the defect was visible under careful visual inspection.

Control Toner Example 6, with no additive treatment, shows no paper contamination, but showed PR contamina-

TABLE 5

Machine Testing in A-zone

| | Initial At (TA = 10 min) | Aged At (TA = 115 min) | Charge-up (115 min – 10 min) | $2^{nd}$ TE (115 min) | $1^{st}$ TE (115 min) | IQ (TA = 10 min) | IQ (TA = 115 min) |
|---|---|---|---|---|---|---|---|
| Target | 380-520 | | ≥60 | ≥0.81 | ≥0.92 | | |
| Comparative Example 1 Control Toner | 378 | 410 | 32 | 0.83 | 0.96 | Good | Good |
| Toner Example 7 | 264 | 233 | −32 | 0.79 | 0.92 | Good | Good |
| Toner Example 9 | 280 | 268 | −12 | 0.85 | 0.91 | Good | High Mottle |
| Toner Example 10 | 414 | 398 | −16 | 0.84 | 0.93 | Good | Good | tion at three checkpoints in A-zone and two checkpoints in J-zone. Toner Example 7 with the C410 treated additive, showed a few streaks on the print at the two last checkpoints in A-zone, but showed no PR contamination at all. Both for the Control Toner Example 6, and for Toner Example 7 there were two checkpoints in A-zone with BCR contamination, and three in J-zone. But note that in A-zone the BCR for Toner Example 7 was cleaned better by the foam than in Control Toner Example 6, so that at the end of the A-zone test there was no BCR contamination in Toner Example 7, it had been cleaned by the foam roll cleaner, which had picked up the contamination. As for the print streaks in Toner Example 7, it may be that the silicone polyether loading on the additive was too much at 3 wt %, leaving some loose oil with the additive, which might then collect any loose additives on the PR into a clump, causing a print streak. The toner of Example 9, treated with 2 wt % of J1015-O, showed no paper contamination, and no PR contamination in A-zone, and only two checkpoints of contamination in J-zone, much superior to the Comparative Example 6. Toner example 9 showed three checkpoints of contamination in A-zone, as did the Comparative Example 6, but no BCR contamination in J-zone. Toner Example 9 showed some foam contamination in A-zone, but this is not a big concern, and again indicates that the foam cleaning of the BCR is better in this example. The toner of Example 10 with 1 wt % treatment of J1015-O, also showed no paper contamination, and just two PR and three BCR checkpoints with any contamination in A-zone, while for J-zone there was no observed contamination at all. Overall, all of the treated additives of Examples 7, 9 and 10 showed improved PR contamination as well as improved BCR contamination.

TABLE 6

| Toner | Additive Surface Treatment | Additive Surface Treatment Loading (wt %) | | Contamination (A-zone) | | | | Contamination (J-zone) | | | |
|---|---|---|---|---|---|---|---|---|---|---|---|
| | | | | 0 kp | 3 kp | 6 kp | 9 kp | 0 kp | 3 kp | 6kp | 9kp |
| Comparative Example 6 | none | none | Paper | — | — | — | — | — | — | — | — |
| | | | PR | — | SV | SV | SV | — | — | SV | SV |
| | | | BCR | — | — | SV | SV | — | SV | SV | SV |
| | | | Foam | — | — | — | — | — | — | — | — |
| Example 7 | C410 | 3 | Paper | — | — | SV | SV | — | — | — | — |
| | | | PR | — | — | — | — | — | — | — | — |
| | | | BCR | — | SV | SV | — | — | SV | SV | SV |
| | | | Foam | — | — | SV | SV | — | — | — | — |
| Example 9 | J1015-O | 2 | Paper | — | — | — | — | — | — | — | — |
| | | | PR | — | — | — | — | — | — | SV | SV |
| | | | BCR | — | SV | SV | SV | — | — | — | — |
| | | | Foam | — | SV | SV | SV | — | — | — | — |
| Example 10 | J1015-O | 1 | Paper | — | — | — | — | — | — | — | — |
| | | | PR | — | — | SV | SV | — | — | — | — |
| | | | BCR | — | SV | SV | SV | — | — | — | — |
| | | | Foam | — | — | — | — | — | — | — | — |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A polymeric composition comprising:
   a silicone-polyether copolymer comprising a polysiloxane unit and a polyether unit; and
   a polymeric additive comprising a copolymer comprising at least a first monomer having a high carbon to oxygen ratio of from about 3 to about 8, a second monomer comprising more than one vinyl group, and at least a third monomer comprising an amine.

2. The polymeric composition of claim 1, wherein the silicone-polyether copolymer is disposed on an exterior surface of the polymeric additive.

3. The polymeric composition of claim 1, wherein the silicone-polyether copolymer is present in the polymeric composition in an amount of from about 0.1% to about 3% by weight based on the total weight of the polymeric composition.

4. The polymeric composition of claim 1, wherein the silicone-polyether copolymer is water soluble or water dispersible.

5. The polymeric composition of claim 1, where the silicone-polyether copolymer having the formula (II)

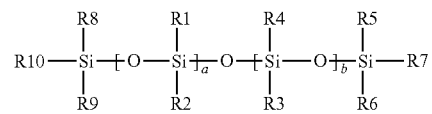

wherein
$R_1$ is H, or an alkyl group;
$R_2$ is alkyl;
each of $R_3$, $R_5$ and $R_8$ independently is H, alkyl, $-(CH_2)_3-O-(CH_2CH_2O)_c-(CH_2(CH_3)CHO)_d-H$, $-(CH_2)_3-O-(CH_2CH_2O)_c-(CH_2(CH_3)CHO)_d-(CH_2CH_2O)_e-H$, $-(CH_2CH_2O)-(CH_2CH_2O)_f-H$, $-(C_nH_{2n})-(C_mH_{2m}O)_c-(C_pH_{2p}O)_d-H$; $R_4$ is $-(CH_2)_3-O-(CH_2CH_2O)_c-(CH_2(CH_3)CHO)_d-H$, $-(CH_2)_3-O-(CH_2CH_2O)_c-(CH_2(CH_3)CHO)_d-(CH_2CH_2O)_e-H$, $-(CH_2CH_2O)-(CH_2CH_2O)_f-H$, or $-(C_nH_{2n})-(C_mH_{2m}O)_c-(C_pH_{2p}O)_d-H$; each of $R_6$, $R_7$, $R_9$ and R$_{10}$ independently may be alkyl, —(CH$_2$)$_3$—O—(CH$_2$CH$_2$O)$_c$—(CH$_2$(CH$_3$)CHO)$_d$—H, —(CH$_2$)$_3$—O—(CH$_2$CH$_2$O)$_c$—(CH$_2$(CH$_3$)CHO)$_d$—(CH$_2$CH$_2$O)$_e$—H, —(CH$_2$CH$_2$O)—(CH$_2$CH$_2$O)$_f$—H, or —(C$_n$H$_{2n}$)—(C$_m$H$_{2m}$O)$_c$—(C$_p$H$_{2p}$O)$_d$—H;

a is from 0 to 1000;
b is from 0 to 300;
each of c, d, and e is independently from 0 to 300;
f is from 1 to 300; and
each of n, m and p is independently integers of from 2 to 5.

6. The polymeric composition of claim 5, wherein the silicone-polyether copolymer is selected from the group consisting of:

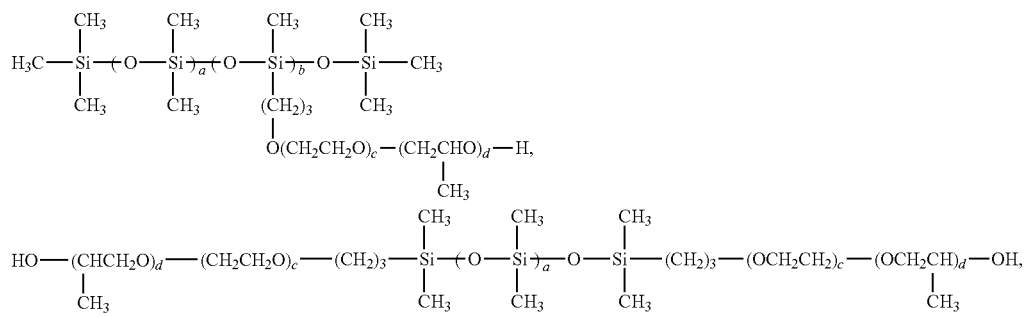

and mixtures thereof, wherein each a is independently from about 5 to about 300, each b is independently from about 3 to about 100, each c is independently from about 1 to about 300, each d is independently from about 0 to about 300, further wherein the average molecular weights of the silicone-polyether copolymer is from about 300 to about 30,000.

7. The polymeric composition of claim 1, wherein the polysiloxane unit has the formula (I):

wherein each R$_1$ and R$_2$ is independently H, unsubstituted alkyl, or substituted alkyl; and
n is from 2 to 1300.

8. The polymeric composition of claim 1, wherein the polyether unit is selected from the group consisting of a poly(ethylene oxide), a poly(propylene oxide), and a copolymer of poly(ethylene oxide) and poly(propylene oxide).

9. The polymeric composition of claim 1, wherein the first monomer of the polymeric additive comprises an aliphatic cycloacrylate selected from the group consisting of cyclohexylmethacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornylmethacrylate, benzyl methacrylate, phenyl methacrylate, and combinations thereof.

10. The polymeric composition of claim 1, wherein the first monomer has a C/O ratio of from about 3 to about 8.

11. The polymeric composition of claim 1, wherein the second monomer of the polymeric additive is selected from the group consisting of diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2'-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthaline, divinyl ether, and combinations thereof.

12. The polymeric composition of claim 1, wherein the third monomer of the polymeric additive is selected from the group consisting of dimethylaminoethyl methacrylate, diethylaminoethyl methacrylate, dipropylaminoethyl methacrylate, diisopropylaminoethyl methacrylate, dibutylaminoethyl methacrylate, and combinations thereof.

13. A toner comprising:
toner particles comprising at least one resin, in combination with an optional colorant, and an optional wax; and
a polymeric composition comprising:
a silicone-polyether copolymer comprising a polysiloxane unit and a polyether unit, and a polymeric additive comprising a copolymer comprising at least a first monomer having a high carbon to oxygen ratio of from about 3 to about 8, a second monomer comprising more than one vinyl group, and at least a third monomer comprising an amine.

14. The toner of claim 13, wherein the silicone-polyether copolymer is disposed on an exterior surface of the polymeric additive.

15. The toner of claim 13, wherein the silicone-polyether copolymer is present in the polymeric composition in an amount of from about 01% to about 3% by weight based on the total weight of the polymeric composition.

16. The toner of claim 13, where the silicone-polyether copolymer having the formula (II)

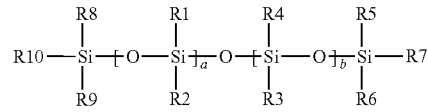

wherein
$R_1$ is H, or an alkyl group;
$R_2$ is alkyl;
each of $R_3$, $R_5$ and $R_8$ independently is H, alkyl, —$(CH_2)_3$—O—$(CH_2CH_2O)_c$—$(CH_2(CH_3)CHO)_d$—H, —$(CH_2)_3$—O—$(CH_2CH_2O)_c$—$(CH_2(CH_3)CHO)_d$—$(CH_2CH_2O)_e$—H, —$(CH_2CH_2O)$—$(CH_2CH_2O)_f$—H, —$(C_nH_{2n})$—$(C_mH_{2m}O)_c$—$(C_pH_{2p}O)_d$—H; $R_4$ is —$(CH_2)_3$—O—$(CH_2CH_2O)_c$—$(CH_2(CH_3)CHO)_d$—H, —$(CH_2)_3$—O—$(CH_2CH_2O)_c$—$(CH_2(CH_3)CHO)_d$—$(CH_2CH_2O)_e$—H, —$(CH_2CH_2O)$—$(CH_2CH_2O)_f$—H, or —$(C_nH_{2n})$—$(C_mH_{2m}O)_c$—$(C_pH_{2p}O)_d$—H; each of $R_6$, $R_7$, $R_9$ and $R_{10}$ independently may be alkyl, —$(CH_2)_3$—O—$(CH_2CH_2O)_c$—$(CH_2(CH_3)CHO)_d$—H, —$(CH_2)_3$—O—$(CH_2CH_2O)_c$—$(CH_2(CH_3)CHO)_d$—$(CH_2CH_2O)_e$—H, —$(CH_2CH_2O)$—$(CH_2CH_2O)_f$—H, or —$(C_nH_{2n})$—$(C_mH_{2m}O)_c$—$(C_pH_{2p}O)_d$—H;
a is from 0 to 1000;
b is from 0 to 300;
each of c, d, and e is independently from 0 to 300;
f is from 1 to 300; and
each of n, m and p is independently integers of from 2 to 5.

17. The toner of claim 16, wherein the silicone-polyether copolymer is selected from the group consisting of:

$$H_3C-Si(CH_3)_2-(O-Si(CH_3)_2)_a-(O-Si(CH_3)((CH_2)_3O(CH_2CH_2O)_c-(CH_2CHO)_d-H)(CH_3))_b-O-Si(CH_3)_2-CH_3$$

where the side chain contains $CH_3$, $$HO-(CHCH_2O)_d-(CH_2CH_2O)_c-(CH_2)_3-Si(CH_3)_2-(O-Si(CH_3)_2)_a-O-Si(CH_3)_2-(CH_2)_3-(OCH_2CH_2)_c-(OCH_2CH)_d-OH$$
with $CH_3$ branches and mixtures thereof, wherein each a is independently from about 5 to about 300, each b is independently from about 3 to about 100, each c is independently from about 1 to about 300, each d is independently from about 0 to about 300, further wherein the average molecular weights of the silicone-polyether copolymer is from about 300 to about 30,000.

18. The toner of claim 13, wherein the polysiloxane unit having the formula (I):

$$*\!-\!\!\left(\!O\!-\!\!\underset{R_2}{\overset{R_1}{Si}}\!\right)_{\!n}\!\!-\!* \qquad (I)$$

wherein
each $R_1$ is independently H, or an alkyl group;
each $R_2$ is independently an alkyl group; and
n is from 2 to 1300;

further wherein the polyether unit is selected from the group consisting of a poly(ethylene oxide), a poly(propylene oxide), and a copolymer of poly(ethylene oxide), poly(propylene oxide), and mixtures thereof.

19. The toner of claim 13, wherein the first monomer of the polymeric additive is present in an amount of from about 40% by weight of the copolymer to about 99.4% by weight of the copolymer, the second monomer of the polymeric additive is present in an amount of from about 0.1% by weight of the copolymer to about 40% by weight of the copolymer, and wherein the third monomer of the polymeric additive is present in an amount of from about 0.1% by weight of the copolymer to about 40% by weight of the copolymer.

20. The toner of claim 13, wherein polymeric composition is present in an amount of from about 0.1% by weight of the toner particles to about 5% by weight of the toner particles.

* * * * *